United States Patent [19]

Sheldon

[11] 4,261,302

[45] Apr. 14, 1981

[54] AIR CLEANING SYSTEM OF INTERNAL COMBUSTION ENGINE

[75] Inventor: John D. Sheldon, Charlotte, N.C.

[73] Assignee: Textron, Inc., Providence, R.I.

[21] Appl. No.: 948,235

[22] Filed: Oct. 3, 1978

[51] Int. Cl.³ .............................................. F01P 1/02
[52] U.S. Cl. .................................. 123/41.7; 123/41.56; 123/41.65
[58] Field of Search ............... 123/41.65, 41.7, 198 E, 123/41.56, 41.62, 41.63, 41.66

[56] References Cited

U.S. PATENT DOCUMENTS

| | | | |
|---|---|---|---|
| 2,425,508 | 8/1947 | Chilton et al. | 123/41.7 |
| 2,446,920 | 8/1948 | Goldberg et al. | 123/41.65 |
| 2,595,175 | 4/1952 | Sonderegger | 123/41.65 |
| 2,825,318 | 3/1958 | Mansfield | 123/41.56 |
| 3,911,876 | 10/1975 | Freyn | 123/41.7 |
| 3,994,067 | 11/1976 | Hazzard et al. | 123/41.7 |

FOREIGN PATENT DOCUMENTS

| | | | |
|---|---|---|---|
| 1526699 | 9/1970 | Fed. Rep. of Germany | 123/198 E |
| 2543530 | 3/1977 | Fed. Rep. of Germany | 123/198 E |
| 266463 | 3/1970 | U.S.S.R. | 123/198 E |

Primary Examiner—Charles J. Myhre
Assistant Examiner—W. Wolfe
Attorney, Agent, or Firm—Robert E. Burns; Emmanuel J. Lobato; Bruce L. Adams

[57] ABSTRACT

The air inlet of the carburetor of an internal combustion engine is connected to an opening in an end wall of the housing of a fan for supplying cooling air to the engine. An inwardly inclined lip at the upstream side of the opening and an inwardly sloping surface at the downstream side of the opening deflect dirt or other solid particles in the air inwardly away from the opening so that the air supplied to the carburetor is freed of such particles. The fan housing and carburetor are directly mounted on the crank case of the engine to provide a compact construction.

8 Claims, 4 Drawing Figures

AIR CLEANING SYSTEM OF INTERNAL COMBUSTION ENGINE

FIELD OF INVENTION

The present invention relates to internal combustion engines and particularly to a dynamic air cleaning system for supplying air to the fuel-air mixing device of the engine.

BACKGROUND OF THE INVENTION

The air supplied to the carburetor or other fuel-air mixing means of an internal combustion engine is customarily filtered to remove solid particles which might clog the carburetor or other fuel-air mixing device or might damage the engine. In an automobile, the air filter is customarily a sizable device which is housed in the engine compartment. However, an air filter of this kind is too bulky and cumbersome to be used on a small internal combustion engine such as those used for filament type trimmers, lawn mowers and chain saws. The air filter of such engines is customarily a small static-type filter comprising porous, fibrous or foraminous material through which the air passes and which is intended to filter out solid particles. However, such a filter becomes quickly clogged when the engine operates in a dirty environment as in the case of a filament type trimmer, garden tiller or lawn mower which operates close to the ground and in the case of a chain saw which produces saw dust and may kick up dirt either from a tree or log being cut or by inadvertant contact with the ground. In order to keep the engine operating properly, the air filter must be frequently changed or cleaned.

SUMMARY OF THE INVENTION

It is an object of the present invention to provide a dynamic type air cleaner which does not clog up and hence does not require replacement or cleaning.

In accordance with the invention the air inlet of the carburetor or other fuel-air mixing means of the engine is connected with an opening in the housing of a fan which supplies cooling air to the engine. The opening is in a surface of the housing over which air driven by the rotor of the fan flows in a predetermined direction. A lip provided at the upstream side of the opening deflects dirt or other solid particles in the air away from the opening so that air flowing through the opening to the fuel-air mixture means is freed of such particles. Moreover, at its downstream side the opening is preferably also provided with a surface which slopes inwardly to the interior of the fan housing so that any solid particles which have spanned the opening are deflected inwardly of the fan housing and hence away from the passage which connects the opening with the fuel-air mixture device. The fan housing and carburetor or other fuel-air mixture device are preferably mounted directly on the crank case of the engine so as to provide a compact construction.

DESCRIPTION OF DRAWINGS

The nature, object and advantages of the invention will be more fully understood by reference to the following drawings in which.

DESCRIPTION OF PREFERRED EMBODIMENT

Figure 1:
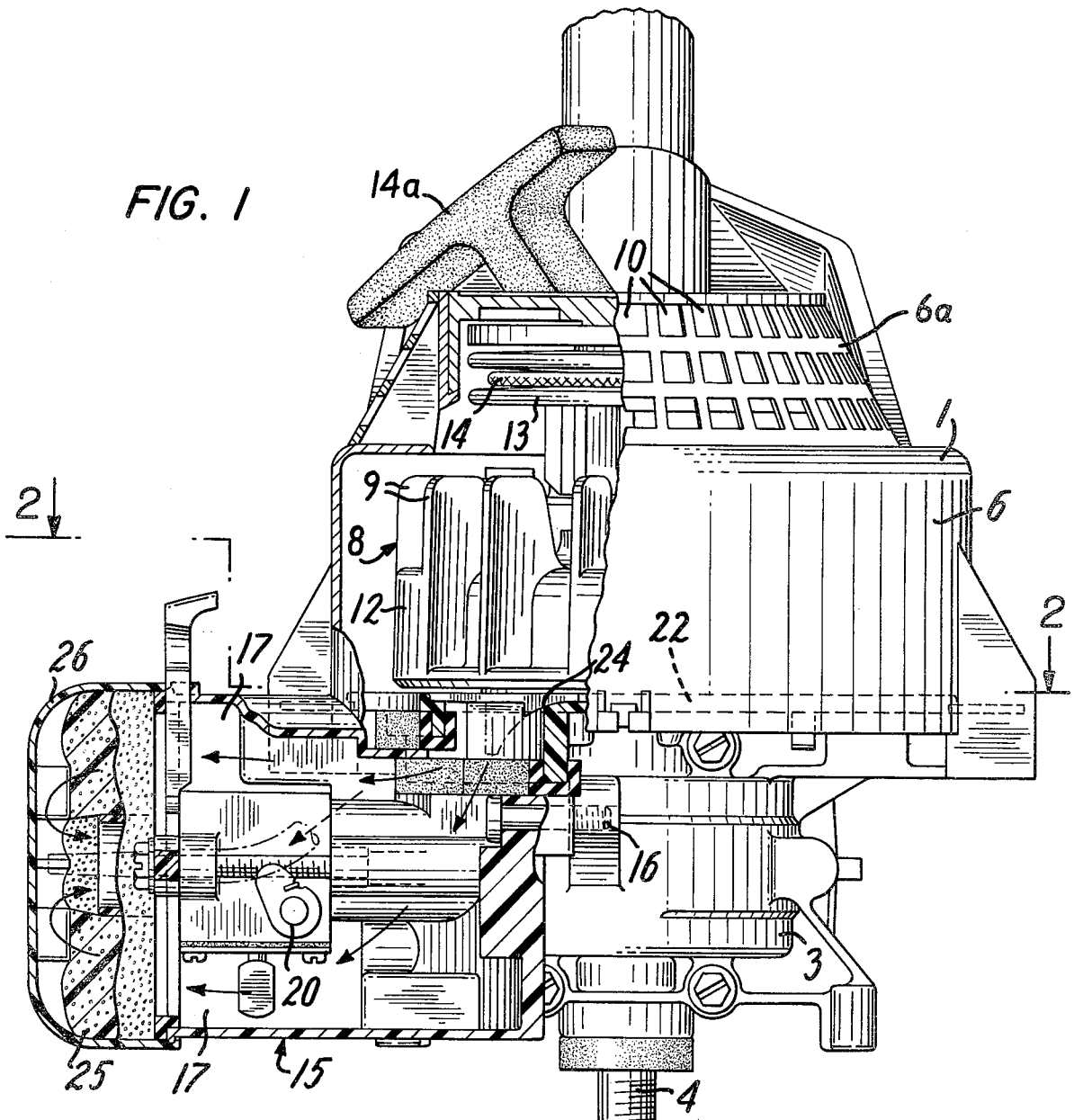
FIG. 1 is a side elevation of a two-stroke cycle internal combustion engine suitable for driving a filament type trimmer, lawn mower or other device, a portion being broken away to show internal construction.

In the drawings there is shown by way of example an air cooled, single cylinder, two-stroke cycle internal combustion engine 1 suitable for driving a filament type trimmer, lawn mower or other implement. The engine is shown as comprising a cylinder 2 and crank case 3. A crank shaft 4 rotatably mounted in the crank case has a downwardly projecting lower end portion 4a which is the power output shaft of the engine. When the engine is used for a filament type trimmer, the rotary head of the trimmer is mounted on the lower end portion of the shaft 4.

Figure 2:
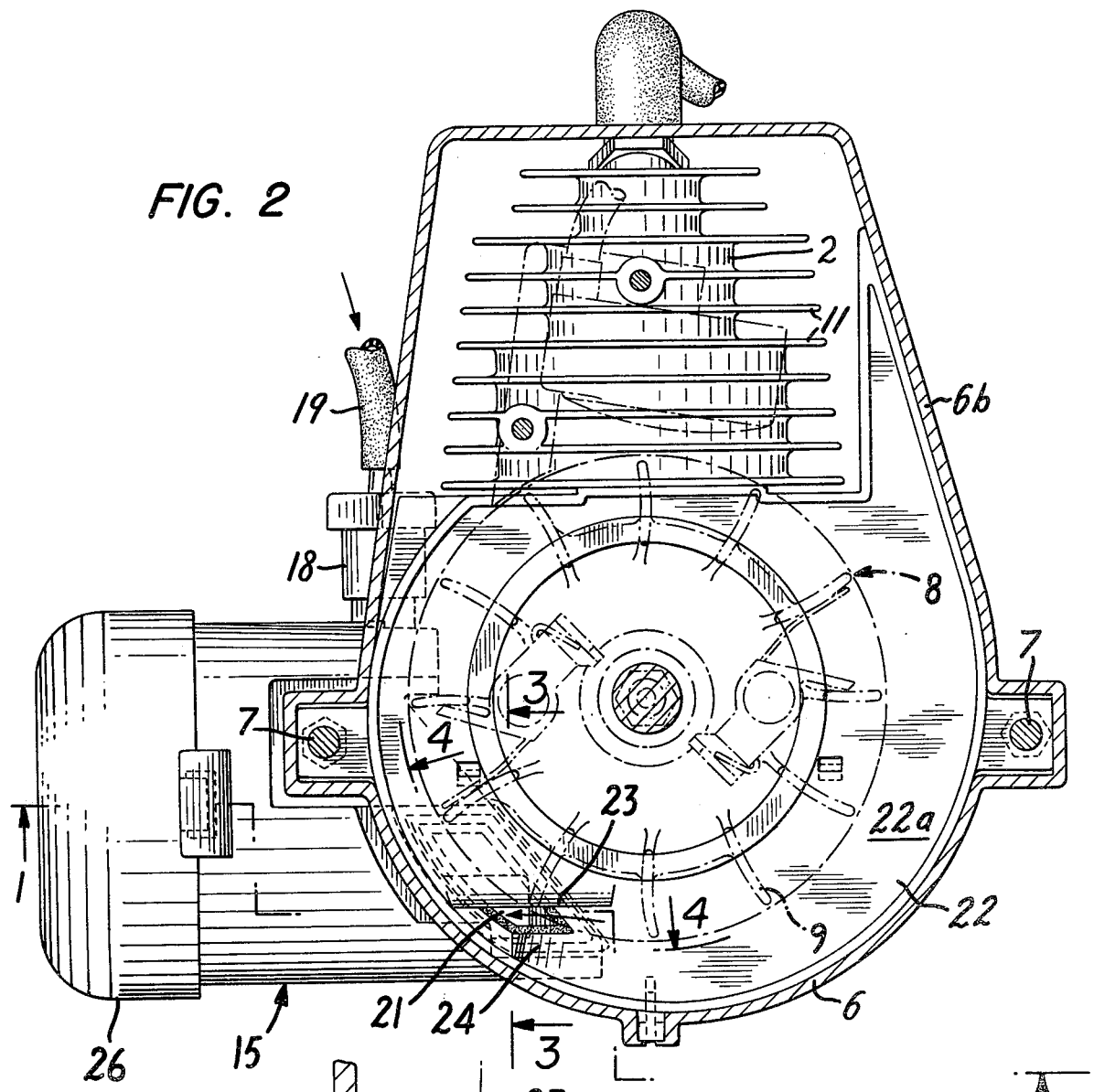
FIG. 2 is a section taken approximately on the line 2—2 in FIG. 1.

A fan housing 6 mounted on the crank case 3, for example by bolts 7, houses a rotor 8 which is mounted on an upper end portion of the crankshaft 4 and comprises a fan, fly wheel and rotor of a magneto. Thus the rotor carries fan blades 9 for drawing in air through a multiplicity of apertures 10 in a frustoconical upper portion 6a of the housing 6 and discharging it through a tangential portion 6b which directs the air onto the cylinder 2 provided with fins 11. The rotor 8 also carries magnetic portions 12 which cooperate with a coil (not shown) mounted in the housing 6 to provide an electric voltage for the ignition of the engine. The upper portion 6a of the housing also contains a rewind-type starter comprising a pulley 13 on an upper end portion of the shaft 4, a cord 14 wound on the pulley and a handle 15 attached to an end of the cord. As viewed in FIG. 2, the fan rotor 8 turns in a counterclockwise direction.

A carburetor 14a is mounted directly on the crank case of the engine, for example by bolts 16. The carburetor 15 has an air inlet passage 17 and a fuel inlet 18 to which fuel is supplied from a fuel tank by flexible tubing 19. The fuel-air mixture formed by the carburetor 15 is delivered directly into the crank case of the engine. The supply of fuel-air mixture to the engine is controlled by a throttle valve on shaft 20.

Figure 4:
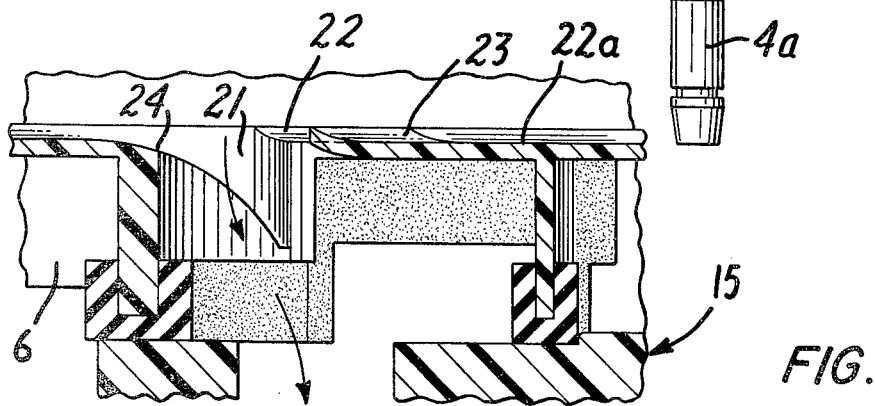
FIG. 4 is an enlarged partial section taken approximately on the arcuate line 4—4 in FIG. 2.
Figure 3:
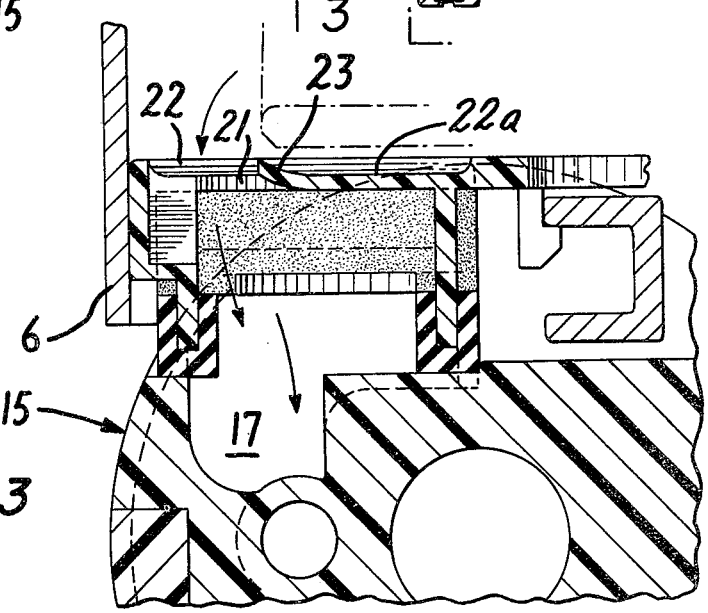
FIG. 3 is an enlarged partial section taken approximately on the line 3—3 in FIG. 2.

In accordance with the invention, the air inlet passage 17 of the carburetor 15 is connected with an opening 21 in a plate 22 which forms the bottom wall of the fan housing 6. The bottom plate 22 of the fan housing has an annular surface 22a which lies in a plane perpendicular to the axis of rotation of the rotor 8. By reason of rotation of the rotor 8 in a counterclockwise direction as viewed in FIG. 2, the air in the fan housing propelled by fan blades 9 moves in a counterclockwise direction and flows across the opening 21 in the bottom plate 22 of the housing. At the upstream side of the opening 21 there is provided a lip 23 which, as seen in FIGS. 3 and 4, curves upwardly. By reason of the upward inclination of the lip, any dirt or other solid particles in the air are deflected upwardly so that they do not pass through the opening 21 and hence do not enter the air inlet passage 17 of the carburetor 15. Moreover, at the downstream side of the opening 21 there is provided an upwardly sloping ramp 24. Any solid particles which, by virtue of their trajectory across the opening 21, land on the ramp 24 are directed upwardly into the interior of the fan housing. While air is also deflected upwardly by the lip 23, it is able, by reason of its lower density, to make the sharp turn required to pass through the opening 21 and into the air inlet passage 17 of the carburetor. Thus the air which enters the inlet passage 17 is freed of dirt and other solid particles which together with the remaining portion of air in the fan housing are discharged through the tangential portion 6b. The main portion of air in the fan housing together with any dirt or other solid particles entrained in the air is discharged onto the exterior of the cylinder 2, where the solid particles have no ill effect.

It will thus be seen that the cleaning of the air supplied to the air inlet passage 17 of the carburetor is accomplished by a dynamic effect and that any dirt or other solid particles in the air are not entrapped as in a static filter but are discharged with the air stream delivered for cooling the cylinder.

The air supplied to the carburetor 15 is further cleaned by a filter 25 of porous material contained in a removable cap portion 26 of the carburetor housing. Air from the inlet passage 17 flows through an annular outer portion of the filter 25 into the cap 26 and then back through a central portion of the filter into the throat of the carburetor. The air is thus twice filtered. As larger and heavier solid particles have been removed from the air supplied through air inlet passage 17 by the dynamic cleaning action described above, the filter 25 removes only smaller and lighter particles which may have entered the inlet passage 17 with the air. Hence the filter 25 requires only infrequent cleaning or removal. The filter 25 is formed of any suitable porous or fibrous material, for example open pore sponge-like material. It is readily removable for cleaning or replacement by removing the cap 26 from the carburetor housing.

It will thus be seen that the air supplied to the carburetor 15 is first cleaned by dynamic action to remove larger and heavier foreign particles and is then twice filtered to remove any fine or light particles which have not been removed by the dynamic cleaning.

Since the fan housing 6 and the carburetor 15 are both mounted directly on the crank case 3 of the engine, a very compact assembly is provided. Moreover, since a major portion of the dirt is removed by the dynamic action of the air cleaning system described above, the filter 25 can be quite small so as to be contained in the cap portion 26 of substantially the same diameter as the carburetor housing.

While a preferred embodiment of the invention has been illustrated in the drawings and is herein described, it will be understood that the invention is susceptible of many variations and modifications and is hence in no way limited to the illustrated embodiment.

What is claimed is:

1. An internal combustion engine comprising means for providing a fuel-air mixture, said means having an air inlet passage, a fan for supplying cooling air for said engine, said fan comprising a fan housing and a fan rotor rotatable in said housing, said housing having an end wall with an annular surface over which air driven by said rotor flows in a direction generally parallel to said annular surface, said annular surface having opening means provided therein for flow of air from said fan housing to said fuel-air mixture providing means, means connecting said opening means with said air inlet passage of said fuel-air mixture providing means, and static means on the upstream side of said opening means for deflecting away from said opening means solid particles in said air driven by the rotor of said fan, and thereby freeing air flowing through said opening means to said fuel-air mixture providing means of said solid particles.

2. An internal combustion engine according to claim 1, in which said deflecting means comprises a lip on the upstream side of said opening means for deflecting solid particles in the air inwardly of said fan housing.

3. An internal combustion engine according to claim 2, in which said opening means has at its downstream side a surface with slopes inwardly of said fan housing, whereby solid particles which have spanned said opening means are guided inwardly of said fan housing.

4. An internal combustion engine according to claim 1, in which said annular surface of said end wall of said fan housing is normal to the axis of rotation of said fan rotor.

5. An internal combustion engine according to claim 1, in which said engine is an air-cooled two-stroke cycle engine having a cylinder, a crank shaft and a crank case, and in which said fan delivers cooling air to said engine cylinder and said fan rotor is driven by said crank shaft, said fuel-air mixture providing means comprising a carburetor receiving air from said fan and supplying fuel-air mixture to said crank case of the engine.

6. An internal combustion engine according to claim 5, in which said fan housing and said carburetor are mounted on said crank case of the engine.

7. An internal combustion engine according to claim 6, in which said carburetor has an air inlet passage into which said opening means in said annular surface opens.

8. An internal combustion engine according to claim 7, in which said carburetor comprises a throat, a housing having a removable cap and a filter of porous material in said cap, said air inlet passage leading to an annular outer portion of said filter, to direct air from said air inlet passage in one direction through said annular outer portion of said filter in one direction and then back through a central portion of said filter in the opposite direction to said throat of said carburetor.

* * * * *